G. D. ROSE.
WOOD SUBSTITUTE AND PROCESS OF MAKING THE SAME.
APPLICATION FILED MAR. 9, 1920.
1,370,155.
Patented Mar. 1, 1921.
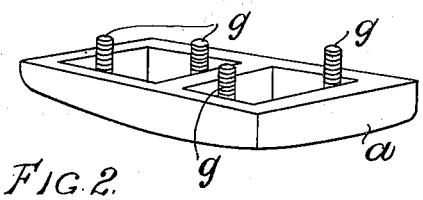
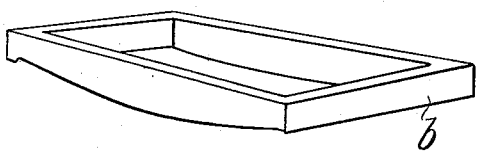
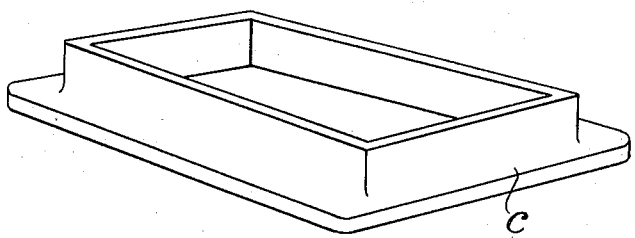
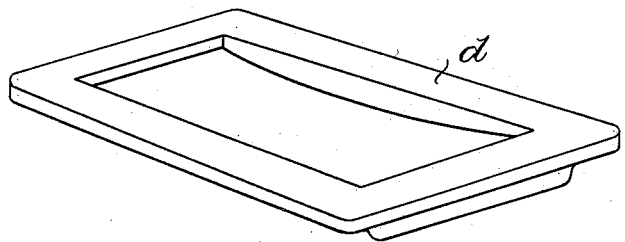
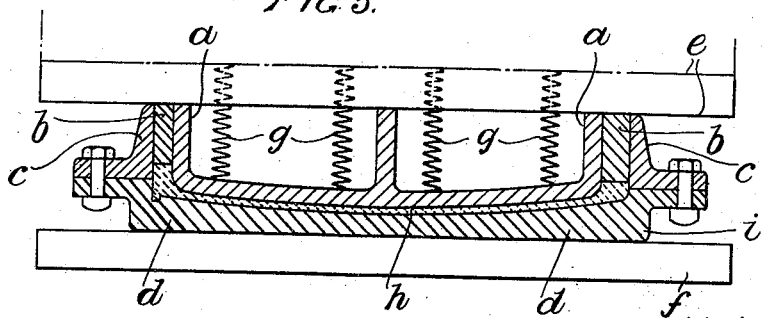
INVENTOR:
George D. Rose
BY
Wm Wallace White
ATTY.

UNITED STATES PATENT OFFICE.

GEORGE DAUBNEY ROSE, OF MANCHESTER, ENGLAND.

WOOD SUBSTITUTE AND PROCESS OF MAKING THE SAME.

1,370,155. Specification of Letters Patent. Patented Mar. 1, 1921.

Application filed March 9, 1920. Serial No. 364,539.

*To all whom it may concern:*

Be it known that I, GEORGE DAUBNEY ROSE, a subject of the King of Great Britain, residing at 56ᵃ Mosley street, Manchester, in the county of Lancaster, England, have invented new and useful Improvements in Wood Substitutes and Processes of Making the Same, of which the following is a specification.

This invention relates to an improved wood substitute which is especially well adapted for the formation of molded articles, such as the bodies, frames, panels and other parts of vehicles, and has for its object to provide a strong and efficient substitute for the wood or other material ordinarily used in the manufacture of such parts.

A further object of the invention is to produce articles formed of coir fiber, either alone or combined with other fibers, as a basic material, said material being impregnated or combined with rubber or other suitable adhesive material and compressed, consolidated, molded into the desired shape and vulcanized.

In carrying out the invention, I prepare a mold or die of the shape and size of the article to be molded, and for purposes of illustration I have shown in the drawings accompanying and forming part of this specification, a suitable form of mold for forming a panel of a vehicle according to the present invention, in which drawing—

Figures 1, 2, 3 and 4 are perspective views of the individual coöperating parts of the mold; and Fig. 5 is a transverse sectional view illustrating the assembled parts with a layer of the panel-forming material therebetween, said mold being clamped between a stationary table and a movable table in a hydraulic press, the parts being shown at the end of the effective stroke.

Referring to the drawings, $a$ designates the die which is used for pressing these panels, $d$ designates the lower part of the main die box or bottom mold, $c$ the upper part of said main die box, the members $c$ and $d$ being provided with flanges by means of which they may be secured together by bolts as shown in Fig. 5, or in any other suitable manner. The reference character $b$ designates a filler member adapted to fill the space between the walls of the member $c$ and the die $a$ above the material being molded, as shown in Fig. 5. The reference characters $e$ and $f$ designate respectively the stationary table and the movable table between which the mold carrying the material hereinafter described may be pressed, in a hydraulic or other suitable press in order to press said material into the desired form.

I lay in the main die box $d$ of the mold the coir fibers or coir yarns either alone or combined with other suitable fibers or yarns or strips or pieces of coir fabric impregnated with rubber, rubber composition, or other suitable adhesive material, each layer of coir base or other fiber alternating with a layer of the rubber or other adhesive material.

The fibers are laid in the mold in such manner as to avoid undue thickness in the fabric where the fibers meet or cross one another and spaces or recesses for hinges, locks, etc., are provided for as for example by applying metal projections or recesses on the face of the dies $a$ $b$ $c$ or $d$ in order to obtain any recess or indentation required.

When built up to the required thickness the materials in the mold are subjected to sufficient pressure in the hydraulic or other press in order to cause an intimate contact between the coir fibers of the layers with each other and the rubber or other adhesive material and to force the latter into the interstices of the layers. To prevent undue thickness in the panel portion I prefer to employ an arrangement of spiral springs $g$ between the face of the table $e$ and the back of the die $a$ by which a preliminary pressure is imparted to the panel $h$ before the full pressure is applied to it and the frame $i$.

When compressed and consolidated to the desired density and while still retained in the mold under compression, the material may be vulcanized in the press or the lid or top of the mold is secured before the pressure is relieved and the mold with the molded material is taken out of the press and placed in a steam pan or other vessel at a suitable pressure to give the necessary temperature for vulcanizing purposes. The rubber or other adhesive material containing a sufficient proportion of sulfur or other vulcanizing agent is softened and thus caused to permeate thoroughly the coir fibers, and when cooled the vulcanizing operation will be completed.

The heat may, if desired, be applied during the compressing operation before the initial pressure is relieved, the mold being heated for this purpose by steam or hot air or other known means; but I consider it preferable, first to compress the molded materials and subsequently to heat and vulcanize as above described.

By means of the procedure above described I may be able to produce panels, doors or sides, as well as ends and other parts of the body of a vehicle in single parts or units, instead of building up each side or other unit of a number of pieces mortised and secured together as is customary in the present practice of building vehicle bodies with wood or other materials.

While I have described and shown herein the improved wood substitute as particularly adapted for the formation of parts of vehicles, it is to be understood that the invention is not limited to such use, but the wood substitute may be used for the formation of any molded article without departing from the spirit and scope of the present invention.

Having thus described my invention, what I claim is:—

1. An article of manufacture, comprising a wood substitute formed of coir fiber impregnated with rubber, compressed, and vulcanized.

2. An article of manufacture, comprising coir fiber impregnated with rubber, compressed, and molded into shape, and vulcanized.

3. The process of forming a wood substitute, which consists in impregnating a layer of coir fiber with an adhesive material, compressing said layer and vulcanizing the same.

4. The process of forming a wood substitute, which comprises impregnating a layer of coir fiber combined with other fibers with rubber, compressing said layer, and vulcanizing the same.

In testimony whereof I have signed my name to this specification.

GEORGE DAUBNEY ROSE.

Witnesses:
C. H. WHITE,
HERBERT ROWLAND ABBEY.